US011223626B2

(12) United States Patent
Gormley

(10) Patent No.: US 11,223,626 B2
(45) Date of Patent: Jan. 11, 2022

(54) SERVICE-TO-SERVICE ROLE MAPPING SYSTEMS AND METHODS

(71) Applicant: Elasticsearch B.V., Mountain View, CA (US)

(72) Inventor: Clinton Gormley, Barcelona (ES)

(73) Assignee: Elasticsearch B.V., Amsterdam (NL)

(*) Notice: Subject to any disclaimer, the term of this patent is extended or adjusted under 35 U.S.C. 154(b) by 428 days.

(21) Appl. No.: 16/022,493

(22) Filed: Jun. 28, 2018

(65) Prior Publication Data
US 2020/0007549 A1 Jan. 2, 2020

(51) Int. Cl.
H04L 29/06 (2006.01)
G06F 16/9535 (2019.01)

(52) U.S. Cl.
CPC ........ H04L 63/102 (2013.01); G06F 16/9535 (2019.01); H04L 63/104 (2013.01); H04L 63/105 (2013.01)

(58) Field of Classification Search
CPC . G06F 16/9535; H04L 63/102; H04L 63/104; H04L 63/105; H04L 63/20
See application file for complete search history.

(56) References Cited

U.S. PATENT DOCUMENTS

| | | | |
|---|---|---|---|
| 7,130,839 B2 * | 10/2006 | Boreham | .......... H04L 29/12132 |
| 7,324,953 B1 | 1/2008 | Murphy | |
| 7,333,943 B1 | 2/2008 | Charuk et al. | |
| 7,644,432 B2 * | 1/2010 | Patrick | .................... H04L 63/20 |
| | | | 726/1 |
| 7,650,505 B1 | 1/2010 | Masurkar | |
| 7,685,430 B1 | 3/2010 | Masurkar | |
| 7,730,523 B1 | 6/2010 | Masurkar | |
| 7,801,967 B1 * | 9/2010 | Bedell | ................. G06F 21/6218 |
| | | | 709/217 |
| 7,970,791 B2 * | 6/2011 | Liao | ....... H04L 63/083 |
| | | | 707/791 |
| 7,975,292 B2 | 7/2011 | Corella | |
| 7,996,392 B2 * | 8/2011 | Liao | ...................... G06F 16/335 |
| | | | 707/723 |
| 8,005,816 B2 * | 8/2011 | Krishnaprasad | ........ G06F 16/20 |
| | | | 707/709 |
| 8,027,982 B2 * | 9/2011 | Ture | .................... G06F 21/6227 |
| | | | 707/741 |
| 8,166,310 B2 | 4/2012 | Harrison et al. | |
| 8,214,394 B2 * | 7/2012 | Krishnaprasad | .... G06F 16/2455 |
| | | | 707/781 |
| 8,239,414 B2 * | 8/2012 | Liao | .................... G06F 16/2455 |
| | | | 707/791 |

(Continued)

OTHER PUBLICATIONS

Search Query Report from IP.com (performed Dec. 18, 2020). (Year: 2020).*

(Continued)

Primary Examiner — Sharon S Lynch
(74) Attorney, Agent, or Firm — Carr & Ferrell LLP

(57) ABSTRACT

Service-to-service role mapping systems and methods are disclosed herein. An example role mapping service is positioned between a directory service and a search engine service, the directory service managing user information and permissions for users, the role mapping service mapping one or more search engine service roles to a user based on the user information and permissions received from the directory service.

22 Claims, 8 Drawing Sheets

(56) References Cited

U.S. PATENT DOCUMENTS

| | | | |
|---|---|---|---|
| 8,332,430 B2* | 12/2012 | Koide | G06F 21/6236 |
| | | | 707/783 |
| 8,352,475 B2* | 1/2013 | Bhatkar | G06F 21/6218 |
| | | | 707/741 |
| 8,412,717 B2* | 4/2013 | Liao | G06F 16/335 |
| | | | 707/748 |
| 8,433,712 B2* | 4/2013 | Koide | G06F 16/90335 |
| | | | 707/748 |
| 8,548,997 B1 | 10/2013 | Wu | |
| 8,595,255 B2* | 11/2013 | Krishnaprasad | G06F 16/2455 |
| | | | 707/781 |
| 8,601,028 B2* | 12/2013 | Liao | G06F 16/951 |
| | | | 707/791 |
| 8,626,794 B2* | 1/2014 | Liao | H04L 63/08 |
| | | | 707/791 |
| 8,707,451 B2* | 4/2014 | Ture | G06F 21/6218 |
| | | | 726/28 |
| 8,725,770 B2* | 5/2014 | Koide | H04L 63/0815 |
| | | | 707/783 |
| 8,793,489 B2* | 7/2014 | Polunin | G06F 21/604 |
| | | | 713/166 |
| 8,838,961 B2 | 9/2014 | Zarfoss, III et al. | |
| 8,875,249 B2* | 10/2014 | Ture | H04L 63/0846 |
| | | | 726/5 |
| 9,069,979 B2* | 6/2015 | Srinivasan | H04L 63/104 |
| 9,071,606 B2 | 6/2015 | Braun et al. | |
| 9,081,816 B2* | 7/2015 | Krishnaprasad | G06F 16/2452 |
| 9,081,950 B2* | 7/2015 | Jain | G06F 21/41 |
| 9,130,920 B2* | 9/2015 | Pelykh | H04L 63/08 |
| 9,177,124 B2* | 11/2015 | Krishnaprasad | G06F 16/951 |
| 9,251,364 B2* | 2/2016 | Ture | G06F 16/951 |
| 9,288,042 B1 | 3/2016 | Madhukar et al. | |
| 9,355,233 B1 | 5/2016 | Chen et al. | |
| 9,407,433 B1 | 8/2016 | Sohi et al. | |
| 9,436,968 B1 | 9/2016 | Kobets et al. | |
| 9,467,437 B2* | 10/2016 | Krishnaprasad | H04L 63/102 |
| 9,479,494 B2* | 10/2016 | Krishnaprasad | G06F 21/31 |
| 9,552,431 B2* | 1/2017 | Nassar | H04L 63/105 |
| 9,594,922 B1 | 3/2017 | McGuire et al. | |
| 9,734,309 B1* | 8/2017 | Allen | H04L 63/102 |
| 9,742,779 B2 | 8/2017 | Ngo et al. | |
| 9,769,154 B2 | 9/2017 | Yang et al. | |
| 9,774,586 B1* | 9/2017 | Roche | G06F 21/6218 |
| 9,781,102 B1 | 10/2017 | Knjazihhin et al. | |
| 9,858,195 B2 | 1/2018 | Bhogal et al. | |
| 9,930,033 B2 | 3/2018 | Chhabra et al. | |
| 9,992,186 B1* | 6/2018 | Drozd | H04L 63/0807 |
| 10,044,723 B1* | 8/2018 | Fischer | H04L 63/0807 |
| 10,057,246 B1* | 8/2018 | Drozd | G06F 21/335 |
| 10,083,247 B2* | 9/2018 | Brown | G06F 16/972 |
| 10,114,964 B2* | 10/2018 | Ramesh | G06Q 10/06 |
| 10,277,618 B1* | 4/2019 | Wu | H04L 63/105 |
| 10,382,421 B2* | 8/2019 | Krishnaprasad | G06F 16/9535 |
| 10,505,982 B2 | 12/2019 | Motukuru et al. | |
| 10,659,307 B2* | 5/2020 | Sinn | H04L 67/10 |
| 11,023,598 B2 | 6/2021 | Grand | |
| 11,025,425 B2 | 6/2021 | Modi | |
| 2003/0037234 A1 | 2/2003 | Fu et al. | |
| 2003/0105742 A1* | 6/2003 | Boreham | H04L 61/1552 |
| 2003/0130928 A1 | 7/2003 | Chozick | |
| 2004/0210767 A1 | 10/2004 | Sinclair et al. | |
| 2005/0055232 A1 | 3/2005 | Yates | |
| 2005/0289354 A1* | 12/2005 | Borthakur | H04L 63/102 |
| | | | 713/182 |
| 2006/0059359 A1 | 3/2006 | Reasor et al. | |
| 2007/0208714 A1* | 9/2007 | Ture | G06F 16/951 |
| 2007/0233688 A1 | 10/2007 | Smolen et al. | |
| 2008/0205655 A1* | 8/2008 | Wilkins | G06Q 10/10 |
| | | | 380/279 |
| 2008/0313712 A1 | 12/2008 | Ellison et al. | |
| 2009/0046862 A1 | 2/2009 | Ito et al. | |
| 2009/0106271 A1 | 4/2009 | Chieu et al. | |
| 2009/0204590 A1* | 8/2009 | Yaskin | G06F 16/93 |
| 2009/0254642 A1 | 10/2009 | Geist | |
| 2009/0271624 A1 | 10/2009 | Cao et al. | |
| 2010/0022306 A1 | 1/2010 | Campion | |
| 2010/0146611 A1 | 6/2010 | Kuzin et al. | |
| 2010/0198804 A1* | 8/2010 | Yaskin | G06F 21/6218 |
| | | | 707/706 |
| 2011/0265160 A1 | 10/2011 | Nettleton | |
| 2012/0060207 A1 | 3/2012 | Mardikar et al. | |
| 2012/0090037 A1* | 4/2012 | Levit | G06F 21/629 |
| | | | 726/28 |
| 2012/0131683 A1* | 5/2012 | Nassar | H04L 67/10 |
| | | | 726/28 |
| 2012/0151563 A1 | 6/2012 | Bolik et al. | |
| 2013/0080520 A1 | 3/2013 | Kiukkonen et al. | |
| 2013/0152191 A1 | 6/2013 | Bright et al. | |
| 2013/0212703 A1* | 8/2013 | Ramesh | G06Q 10/06393 |
| | | | 726/28 |
| 2013/0232539 A1* | 9/2013 | Polunin | G06Q 10/047 |
| | | | 726/1 |
| 2013/0326588 A1* | 12/2013 | Jain | G06F 21/41 |
| | | | 726/4 |
| 2014/0075501 A1* | 3/2014 | Srinivasan | H04L 63/104 |
| | | | 726/1 |
| 2014/0164776 A1 | 6/2014 | Hook et al. | |
| 2014/0196115 A1* | 7/2014 | Pelykh | G06F 21/554 |
| | | | 726/4 |
| 2014/0208100 A1 | 7/2014 | Kendall | |
| 2014/0337941 A1 | 11/2014 | Kominar et al. | |
| 2015/0012919 A1 | 1/2015 | Moss et al. | |
| 2015/0089575 A1 | 3/2015 | Vepa et al. | |
| 2015/0106736 A1* | 4/2015 | Torman | G06F 21/629 |
| | | | 715/745 |
| 2015/0106893 A1 | 4/2015 | Hou et al. | |
| 2015/0112870 A1 | 4/2015 | Nagasundaram et al. | |
| 2015/0169875 A1 | 6/2015 | Ide et al. | |
| 2015/0349954 A1 | 12/2015 | Borda | |
| 2015/0363607 A1 | 12/2015 | Yang et al. | |
| 2016/0103890 A1* | 4/2016 | Boe | H04L 41/0813 |
| | | | 707/722 |
| 2016/0173475 A1* | 6/2016 | Srinivasan | H04L 63/08 |
| | | | 726/6 |
| 2016/0182471 A1* | 6/2016 | Wilson | H04L 63/06 |
| | | | 713/164 |
| 2017/0011214 A1 | 1/2017 | Cavanagh et al. | |
| 2017/0063931 A1* | 3/2017 | Seed | H04L 63/20 |
| 2017/0083698 A1 | 3/2017 | Scott et al. | |
| 2017/0103470 A1 | 4/2017 | Raju | |
| 2017/0134434 A1* | 5/2017 | Allen | H04L 63/20 |
| 2017/0322985 A1* | 11/2017 | Boe | G06F 16/242 |
| 2017/0353444 A1 | 12/2017 | Karangutkar et al. | |
| 2018/0109421 A1* | 4/2018 | Laribi | H04L 41/0843 |
| 2018/0210091 A1* | 7/2018 | DePaoli | G06Q 30/0276 |
| 2018/0287800 A1* | 10/2018 | Chapman | H04L 63/0428 |
| 2018/0300117 A1 | 10/2018 | Ackerman | |
| 2018/0367528 A1 | 12/2018 | Schwarz et al. | |
| 2019/0018869 A1* | 1/2019 | Bhagwat | G06F 16/2228 |
| 2019/0018870 A1* | 1/2019 | Bhagwat | G06F 16/2228 |
| 2019/0052537 A1* | 2/2019 | Sinn | H04L 41/12 |
| 2019/0080318 A1 | 3/2019 | Yuan et al. | |
| 2019/0116623 A1* | 4/2019 | Apte | A63F 13/352 |
| 2019/0245763 A1* | 8/2019 | Wu | H04L 41/145 |
| 2019/0394040 A1 | 12/2019 | Modi | |
| 2020/0036522 A1 | 1/2020 | Willnauer | |
| 2020/0036527 A1 | 1/2020 | Girdhar et al. | |
| 2020/0184090 A1 | 6/2020 | Grand | |
| 2021/0168149 A1 | 6/2021 | Gormley | |
| 2021/0216652 A1 | 7/2021 | Grand | |
| 2021/0243024 A1 | 8/2021 | Modi | |
| 2021/0248250 A1 | 8/2021 | Grand | |

OTHER PUBLICATIONS

Search Query Report from IP.com (performed May 7, 2021) (Year: 2021).*

Search Query Report from IP.com (performed Sep. 28, 2021) (Year: 2021).*

(56) References Cited

OTHER PUBLICATIONS

Willnauer, Daniel, "Default Password Removal," U.S. Appl. No. 16/047,959, filed Jul. 27, 2018, Specification, Claims, Abstract, and Drawings, 37 pages.

Willnauer, Daniel., "Shard Splitting," U.S. Appl. No. 16/176,956, filed Oct. 31, 2018, Specification, Claims, Abstract, and Drawings, 47 pages.

Gejibo, Samson et al., "Secure data storage for mobile data collection systems", Proceedings of the International Conference on Management of Emergent Digital EcoSystems, Oct. 28-31, 2012, pp. 131-144.

Kumbhar et al., "Hybrid Encryption for Securing Shared Preferences of Android Applications," 2018 1st International Conference on Data Intelligence and Security (ICDIS), 2018, pp. 246-249.

* cited by examiner

```
POST /_xpack/security/role/my_admin_role
{
  "cluster": ["all"],
  "indices": [
    {
      "names": [ "index1", "index2" ],
      "privileges": ["all"],
      "field_security" : { // optional
        "grant" : [ "title", "body" ]
      },
      "query": "{\"match\": {\"title\": \"foo\"}}" // optional
    }
  ],
  "run_as": [ "other_user" ], // optional
  "metadata" : { // optional
    "version" : 1
  }
}
```

| Type | Description | Example |
|---|---|---|
| Simple String | Exactly matches the provided value. | "esadmin" |
| Wildcard String | Matches the provided value using a wildcard. | "*,dc=example,dc=com" |
| Regular Expression | Matches the provided value using a Lucene regexp. | "/.*-admin[0-9]*/" |
| Number | Matches an equivalent numerical value. | 7 |
| Null | Matches a null or missing value. | null |
| Array | Tests each element in the array in accordance with the above definitions. If *any* of elements match, the match is successful. | ["admin", "operator"] |

FIG. 3

```
POST /_xpack/security/role_mapping/mapping1
{
  "roles": [ "user"],
  "enabled": true,
  "rules": {
    "field" : { "username" : "*" }
  },
  "metadata" : {
    "version" : 1
  }
}
```

*FIG. 4*

```
POST /_xpack/security/role_mapping/mapping2
{
  "roles": [ "user", "admin" ],
  "enabled": true,
  "rules": {
     "field" : { "username" : [ "esadmin01", "esadmin02" ] }
  }
}
```

*FIG. 5*

```
POST /_xpack/security/role_mapping/mapping3
{
  "roles": [ "superuser" ],
  "enabled": true,
  "rules": {
    "any": [
      {
        "field": {
          "username": "esadmin"
        }
      },
      {
        "field": {
          "groups": "cn=admins,dc=example,dc=com"
        }
      }
    ]
  }
}
```

FIG. 6

```
POST /_xpack/security/role_mapping/mapping4
{
  "roles": [ "ldap-user" ],
  "enabled": true,
  "rules": {
    "field" : { "realm.name" : "ldap1" }
  }
}
```

FIG. 7

```
POST /_xpack/security/role_mapping/mapping5
{
  "roles": [ "example-user" ],
  "enabled": true,
  "rules": {
    "field" : { "dn" : "*,ou=subtree,dc=example,dc=com" }
  }
}
```

*FIG. 8*

```
POST /_xpack/security/role_mapping/mapping7
{
  "roles": [ "superuser" ],
  "enabled": true,
  "rules": {
    "all": [
      {
        "any": [
          {
            "field": {
              "dn": "*,ou=admin,dc=example,dc=com"
            }
          },
          {
            "field": {
              "username": [ "es-admin", "es-system" ]
            }
          }
        ]
      },
      {
        "field": {
          "groups": "cn=people,dc=example,dc=com"
        }
      },
      {
        "except": {
          "field": {
            "metadata.terminated_date": null
          }
        }
      }
    ]
  }
}
```

*FIG. 9*

```
{
  "mapping7": {
    "enabled": true,
    "roles": [
      "superuser"
    ],
    "rules": {
      "all": [
        {
          "any": [
            {
              "field": {
                "dn": "*,ou=admin,dc=example,dc=com"
              }
            },
            {
              "field": {
                "username": [
                  "es-admin",
                  "es-system"
                ]
              }
            }
          ]
        },
        {
          "field": {
            "groups": "cn=people,dc=example,dc=com"
          }
        },
        {
          "except": {
            "field": {
              "metadata.terminated_date": null
            }
          }
        }
      ]
    },
    "metadata": {}
  }
}
```

*FIG. 10*

SERVICE-TO-SERVICE ROLE MAPPING SYSTEMS AND METHODS

FIELD

The present disclosure is directed to service-to-service role mapping, and more specifically, but not by way of limitation, to systems and methods that provide service-to-service role mapping for management and assignment of user roles for a first service, such as a search engine service, based on parameters or permissions for users in a second service such as an active directory access service of a network protocol layer.

SUMMARY

According to various embodiments, the present technology is directed to a method comprising: establishing a plurality of roles for a first service; mapping a role of the plurality of roles to a user based on metadata of the user received from a second service, the metadata being indicative of permissions granted to the user within the second service as well as information that is indicative of the user within the second service; and assigning the role to the user.

According to various embodiments, the present technology is directed to a system comprising: a role mapping service configured to establish roles for a first service, the roles defining permissions granted to a user for the first service; map one or more roles to the user based on metadata of the user received from a second service, the metadata being indicative of permissions granted to the user by the second service; and assign the one or more roles to the user.

According to various embodiments, the present technology is directed to a system comprising: a role mapping service positioned between an active directory service or similar network layer and a search engine service, the active directory service managing user information and permissions for users, the role mapping, mapping one or more search engine service roles to a user based on the user information and permissions received from the directory service.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 2 illustrates a JSON code example for creating a role.

FIG. 3 illustrates a table of field rules for use in accordance with the present disclosure in creation of role mapping rules.

FIG. 4 illustrates a JSON DSL example role mapping that assigns a "user" role to all users that have logged into a service.

FIG. 5 illustrates a JSON DSL example role mapping that assigns the "user" and "admin" roles to specific users.

FIG. 6 illustrates a JSON DSL example role mapping that assigns a "superuser" role to any user with a specific name or with a specific CommonName in an LDAP identifier.

FIG. 7 illustrates a JSON DSL example role mapping that matches users who authenticated against a specific LDAP realm.

FIG. 8 illustrates a JSON DSL example role mapping that matches users who authenticated against a specific LDAP sub-tree, or who have a specific CommonName, and who have not been terminated.

FIG. 9 illustrates a JSON DSL example complex function allowing for wildcard mapping where all illustrated conditions are met.

FIG. 10 illustrates a JSON DSL example call of the present disclosure.

DETAILED DESCRIPTION

Figure 1:
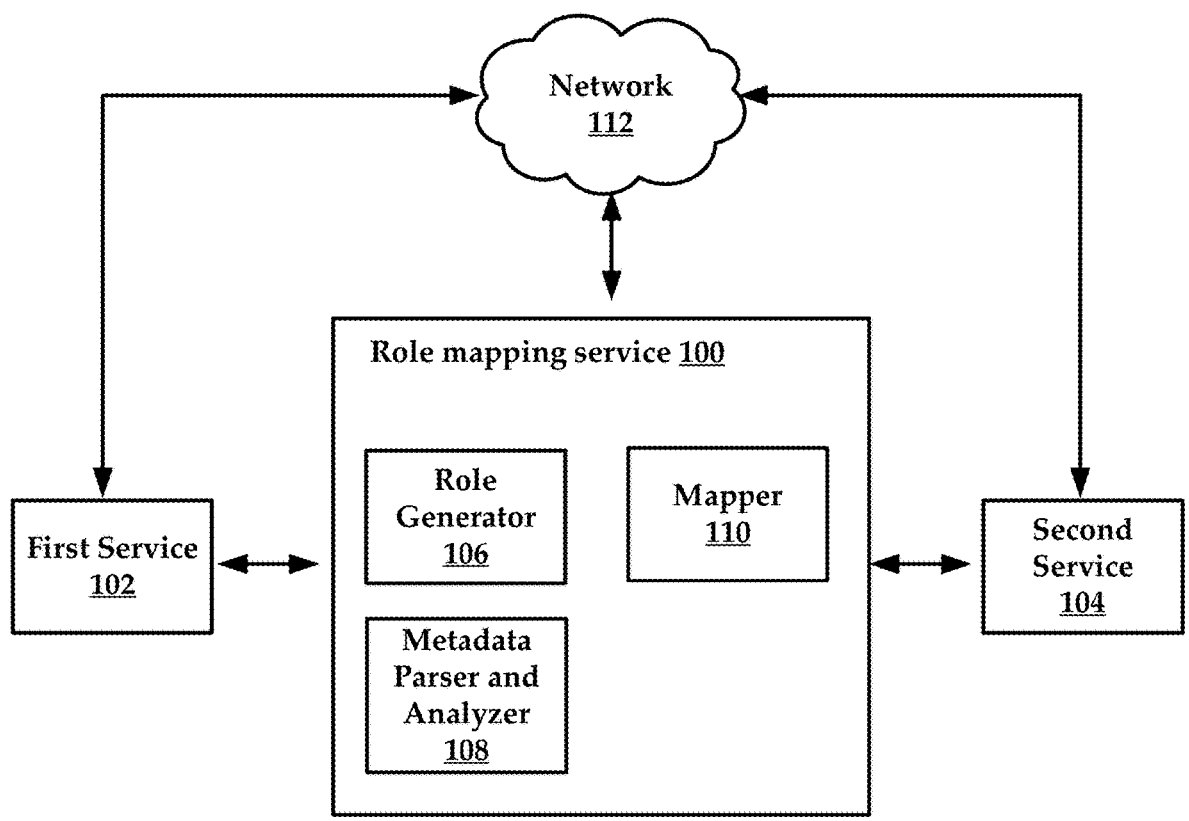
FIG. 1 is a schematic diagram of an example system constructed in accordance with the present disclosure.

The present disclosure relates generally to systems and methods that provide for mapping and assignment of roles between two or more services. More specifically, the systems and methods disclosed herein map the permissions and indicative information of a user in a first system or service to a role that provides for permissions or allowed behaviors within a second (different) system or service than the first. In one general example, the systems and methods herein provide a role mapping service that maps users to roles for a search engine service based on user data established in a directory access service such as a lightweight directory access protocol service (LDAP). In one specific example, permissions related to the roles of the search engine service can be related to document permissions already granted to a user in LDAP. For example, these permissions enable a user to read, edit, delete, or otherwise utilize digital documents found in a search query. To be sure, these are merely example services for which roles can be assigned and are not limiting unless specifically claimed as such.

In general, the present disclosure provides for a technical solution to a technical problem of managing roles and permissions within service based computing environments such as the ones disclosed herein.

The systems and methods herein establish roles for users with respect to a first service. These roles define permissions for the user relative to the first service. These roles for the first service are mapped to a user based on permissions or user data gathered from a second service such as LDAP. It will be understood that the second service can include any service for which user authentication, user data, and permissions are available. Thus, the second service can include, for example, a relational database management service, a customer resource management service, and so forth. To be sure, the second service need not be a specific service, but can include any process or system that stores and manages user data and permissions for the user for a purpose.

The first service can leverage authentication of a user in a second service without performing a specific authentication of the same user at the first service level. The role mapping services disclosed herein leverage authentication and parameters established by the second service in order to prevent unnecessary duplication of authentication and/or role definition at the first service level.

Broadly described, the systems and methods herein create roles that are used to access and utilize the first service, such as the search engine service. Once roles are created, the role mapping services disclosed herein can map users to a role for use in the first service by analyzing permissions and/or user data obtained from the second service. In one example, the role mapping service obtains metadata from the second service regarding one or more users. The role mapping service parses the metadata and maps the metadata to one or more roles using one or more role mapping rulesets. In this way, the role mapping service leverages the permission granting provided through the second service in order to determine an appropriate role(s) for a user with respect to the first service. These and other advantages of the present disclosure are provided herein with reference to the collectively drawings.

FIG. 1 is a schematic diagram of an example role mapping service 100, constructed in accordance with the present disclosure. The role mapping service 100 is illustrated in the context of an environment that includes a first service 102 and a second service 104. In some embodiments, the role mapping service 100 is embodied as a system such as a server, or a service provided through a cloud. In other embodiments, the role mapping service 100 is embodied as a layer in a network protocol stack between a directory service such as LDAP and a search service, or in general between any first service that stores user data and parameters and a second service that leverages the user data and parameters. In one or more instances, the role mapping service 100, the first service 102, and the second service 104 can communicatively couple over a network 112.

The role mapping service 100 provides a mapping functionality between the user data and parameters and roles (information indicative of a user) used within the context of the second service. In other embodiments, the role mapping service 100 is configured as an application programming interface (API) that is used for mapping user in a second service to a role associated with a first service.

The role mapping service 100 generally comprises a role generator 106, a metadata parser and analyzer 108, and a mapper 110. In general, the role generator 106 is configured to create a role by allowing a user to establish a role name. In some embodiments, a role comprises any combination of the following parameters. These parameters can be specified in the body of a JSON request and pertain to creating a role. In one embodiment, a cluster parameter can comprise a list of cluster privileges. These privileges define cluster level actions that users with this role are able to execute. In some embodiments, an indices parameter comprises a list of indices permissions entries.

In various embodiments, a field security parameter comprises document fields for which owners of a role have read access. In more detail, as noted herein, the first service can include a search engine service that allows a user to retrieve documents. The field security parameter defines fields of a document for which the user is granted access.

In one or more embodiments, a names parameter comprises a list of indices (or index name patterns) to which the permissions in this entry apply, and in some instances a privileges parameter that comprises index level privileges that owners of a role have on the specified indices, such as the ability to read data from the index, write data to the index, manage index-level settings, or monitor the index state. By non-limiting example if a document has attributes such as {user: "steve", address:"amsterdam", phone: "112313"}, field security may restrict the user to only the user and address fields.

According to some embodiments, a query parameter is utilized that specifies a search query that defines documents for which owners of a role have read access. In some embodiments, a document within the specified indices must match this query for it to be accessible by the owners of the role.

Another example and optional parameter includes metadata. Within a metadata object, keys that begin with "_" are reserved for system usage. This additional metadata is somewhat distinguishable from the metadata generally described herein. To be sure, parameters passed from the second service to the first service that are indicative of user data and permissions of a user are referred to generally as metadata. This particular metadata parameter includes any specific additional metadata fields that are specific to a particular role. Yet another example and optional parameter includes run_as that comprises a list of users that owners of a role can impersonate.

Using the aforementioned various parameters, the role generator 106 can create a plurality of roles for a first service. In one example, a first role includes a general user which includes any user that has logged into the first service and has a corresponding set of data available that the first service can utilize to map a role to the user. A role mapping in general is a logical expression that includes a set of desired parameters that, if met, indicate that a user should be assigned the role. The role can include any permutation of parameters described above. A JSON code example for creating a role is illustrated in FIG. 2.

Once roles have been generated, the role mapping service 100 can utilize the metadata parser and analyzer 108 to evaluate metadata received from a second service in order to map one or more of these pre-generated roles to a user. This parsed metadata is then provided to the mapper 110 for role mapping through a comparison and matching process.

The metadata parser and analyzer 108 receives metadata from the second service 104. The mapper 110 evaluates the metadata using a set of rules and maps a pre-generated role to the user identified by the metadata. As noted herein, the metadata includes, for example, permissions of a user with respect to the second service. The metadata can also include information that is indicative of the user such as a name or group to which the user belongs. Other indicative information could include an organizational role of the user or an administration indication such as a general or super user. These are merely examples of information that can be transmitted as metadata. In general, the role mapping service can coordinate with the second service to provide metadata that is capable of use by the role mapping service in mapping users to roles at the first service level.

Role mappings comprise rules that identify users and a list of roles that are granted to those users. In some embodiments, a role mapping rule is a logical condition that is expressed using a JSON domain-specific language (DSL). The DSL supports the following rule types that include, but are not limited to any, all, field, and except. The "any" rule type evaluates to true if any of the contained conditions evaluate to true. The "all" rule type evaluates to true if all of the contained conditions evaluate to true. The "except" rule, which may only be used inside an "all" rule, evaluates to true if its contained condition (which may be an "any", "all", or "field" condition) evaluates to false.

The "field" rule, in some embodiments, is a building block for a role-mapping expression. The field rule takes a single object as its value and that object comprises a single member with key F and value V. The field rule looks up the value of F within a user object and tests whether the user value matches the provided value V. Examples of field rules include, but are not limited to a simple string, a wildcard string, a regular expression, a number, null, and an array. Examples of these field rules are illustrated in the table 300 of FIG. 3.

In some embodiments, the mapper 110 is configured to perform a user object analysis as part of the role mapping process. In various embodiments, a user object against which rules are evaluated can include fields such as username, dn (designated name), cn (common name), groups, metadata, and realm. It will be understood that the user object is a parameter that is indicative of a specific user or a group to which the user belongs. The user object is, in some instances, specified by a format or structure used by second service to identify a user and their permissions.

The mapper 110 is configured to utilize the user object parameters that are specific to the second service being used. The example user object values specified above are for use with LDAP, as an example.

A groups field is multi-valued in some embodiments. For example, a user can belong to many groups. When a field rule is applied against a multi-valued field, it is considered to match by the mapper 110 if at least one of the member values matches. For example, the following rule matches any user who is a member of the admin group, regardless of any other groups they belong to {"field": {"groups": "admin"}}.

In some embodiments, the mapper 110 creates a logical mapping or path between a user and a pre-generated role created by the role generator 106. In various embodiments, the path comprises a distinct name that identifies a role mapping. A name is used as an identifier to facilitate interactions via the role mapping service 100 (which can be embodied as an API). The path does not affect the behavior of a mapping, but if a query for a role does not include a specific path, the role mapping service 100 may return information about all role mappings.

In some embodiments, the mapper 110 generates a request for a mapping. A process for adding a request comprises one or more of the following role mapping parameters such as enabled, metadata, roles, and rules. In more detail, the enabled role mapping parameter indicates that a role is enabled for mapping. Those roles that are disabled are unavailable for mapping and the mapper 110 will ignore such roles.

The metadata role mapping parameter includes additional metadata defining additional aspects regarding which roles are assigned to a user. Within the metadata object, keys beginning with "_" are reserved for system usage in some instances. A roles role mapping parameter includes a list of roles that are granted to users that match one or more role-mapping rules as disclosed herein. A rules role mapping parameter comprises rules that determine which users should be matched by a mapping. A rule is a logical condition that is expressed by using a JSON DSL, in some embodiments.

FIG. 4 illustrates a JSON DSL example role mapping that assigns a "user" role to all users that have logged into a service. In this example, metadata is an optional role mapping parameter. A successful call returns a JSON structure that illustrates whether a mapping has been created or updated. FIG. 5 illustrates a JSON DSL example role mapping that assigns the "user" and "admin" roles to specific users. FIG. 6 illustrates a JSON DSL example role mapping that matches any user where either the username is esadmin or the user is in the cn=admin,dc=example,dc=com group. FIG. 7 illustrates a JSON DSL example role mapping that matches users who authenticated against a specific LDAP realm, while FIG. 8 illustrates a JSON DSL example role mapping that matches users who authenticated against a specific LDAP sub-tree.

In other examples, rules for role mapping are more complex than those described above. For example, can include wildcard matching. For example, the mapping illustrated in the JSON DSL example of FIG. 9 matches any user where all of the following conditions are met. These conditions relate specifically to LDAP in this example, but are not limited as such. In a first condition (e.g., parameter), the Distinguished Name matches the pattern *,ou=admin, dc=example,dc=com, or the username is es-admin, or the username is es-system. In a second condition the user is in the cn=people,dc=example,dc=com group, and the in a third condition the user does not have a terminated_date. This example illustrates a relationship between rules of a role and metadata/parameters used by LDAP, for instance.

According to some embodiments, the mapper 110 is configured to retrieve a role mapping using a GET request to a specific REST endpoint (such as a URL) of the role mapping service 100. A successful call retrieves an object, where the keys are the names of the request mappings, and the values are the JSON representation of those mappings. An example successful call is illustrated in FIG. 10. In some embodiments, multiple role mappings can be retrieved and roles can be updated and/or deleted as needed.

Figure 11:
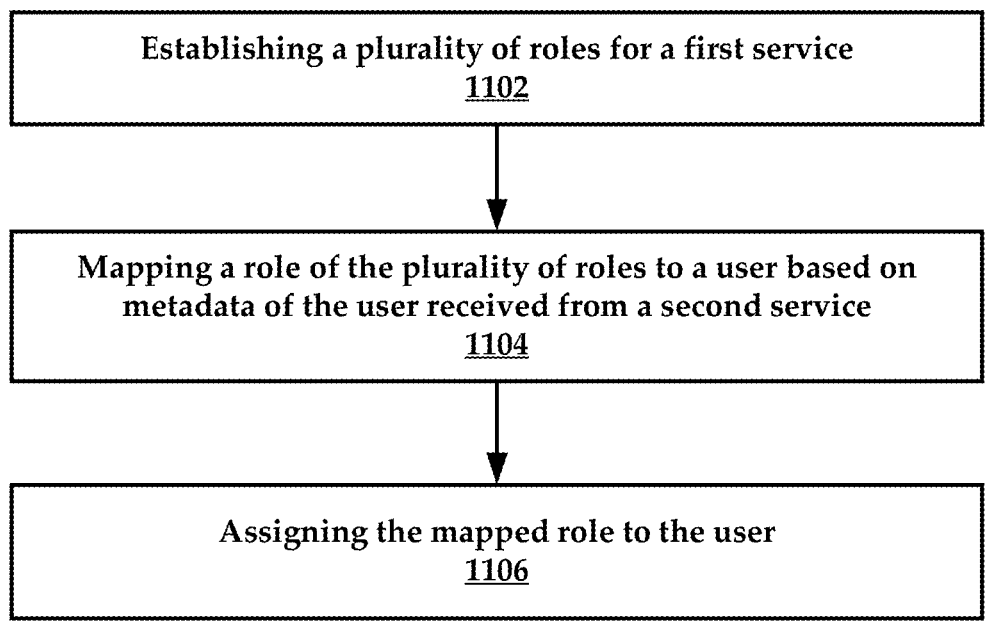
FIG. 11 is a flowchart of an example method of the present disclosure.

FIG. 11 is a flowchart of an example method performed using any of the systems of the present disclosure. In one or more embodiments, the method includes a step 1102 of establishing a plurality of roles for a first service. For example, a plurality of roles are created that are for use in a search engine service. Each of the roles can comprise a set of role parameters that define permissions for the role within the search engine service.

In some embodiments, the method comprises a step 1104 of mapping a role of the plurality of roles to a user based on metadata of the user received from a second service. As noted above, the metadata is indicative of permissions granted to the user within the second service as well as information that is indicative of the user within the second service. The role and/or permissions mapped to a user can correspond to the permissions available to the user in the first service. This allows for a single location for user permissions and authentication at the first service. The second service can utilize the permissions and authentication of the first service through role creation and mapping. In sum, the mapping of the role is defined by a domain-specific language having parameters that match with one or more of the permissions granted to the user from the second service.

Mapping occurs, in some embodiments, based on a mapping rule(s) that allow for matching of one of the plurality of roles to a user based on the metadata received. Once the role is mapped, the role can be assigned to the user when the user utilizes the search engine service in step 1106. The roles generated for the search engine service can be referred to as search engine service roles.

As noted above, the first service comprises a search engine service and the second service comprises a directory access service or directory access protocol.

In some embodiments, step 1106 includes creating a role-mapping expression for each of the plurality of roles. The role-mapping expression can be comprised of a field rule that defines one or more field and value pairs, and a user field that is indicative of a distinguished name of the user or any group to which the user belongs.

The method can further include generating a mapping request comprising a designation if a mapping is enabled or disabled, a list of the plurality of roles granted to users that match role-mapping rules, and rules that determine the users matched by the role-mapping rules. The mapping request can include any permutation and/or combination of these features. In addition to the general metadata received from the first service, a mapping request can comprise optional metadata that additionally defines roles assigned to the users. This optional metadata includes any specific metadata fields that are specific to a role.

In some embodiments, the present disclosure can include a system or service that is specifically configured to establish roles for a first service. Again, the roles defining permissions granted to a user for the first service. The system can also map one or more roles to the user based on metadata of the user received from a second service. To be sure, the metadata is indicative of permissions granted to the user by the second service. The system can also assign the one or more roles to the user based on the mapping. As noted herein, the role mapping service is distinct from and communicatively coupled to the first service and the second service. Alternatively, the role mapping service is configured to function as an application programming interface between the first service and the second service. In some instances, the role mapping service provides role mapping and assignment of the roles to users.

In one general embodiment, a system can include a role mapping service positioned between a directory service or similar network layer and a search engine service. The directory service manages user information and permissions for users. The role mapping service maps one or more search engine service roles to a user based on the user information and permissions received from the directory service.

Figure 12:
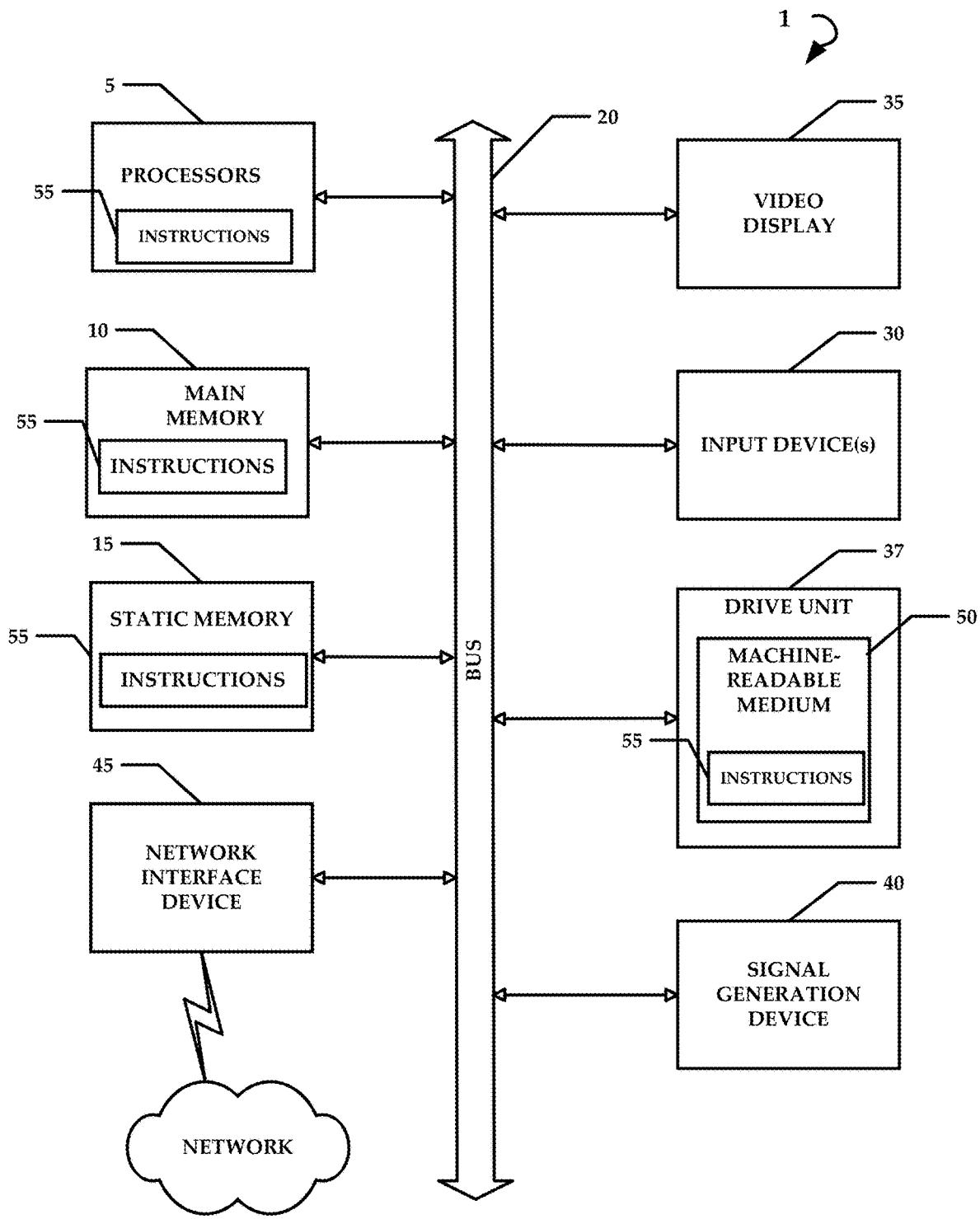
FIG. 12 is a schematic diagram of an example computer device that can be utilized to implement aspects of the present technology.

FIG. 12 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be, for example, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within static memory 15 and/or within the processors 5 during execution thereof by the computer system 1. The main memory 10, static memory 15, and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, section, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure. For example, the technology is not limited to use for stopping email threats, but applies to any messaging threats including email, social media, instant messaging, and chat.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method, comprising:
   establishing a plurality of roles for a first service, wherein the first service comprises a search engine service;
   mapping a role of the plurality of roles to a user based on metadata of the user received from a second service, the metadata being indicative of permissions granted to the user within the second service as well as information that is indicative of the user within the second service, the role and the permissions that are mapped to the user corresponding to user permissions in the first service, resulting in the user permissions and authentication both being located at the second service, wherein the first service is further configured to utilize the user permissions and the authentication of the second service through role creation and mapping, wherein the roles comprise a combination of parameters specified in a JavaScript Object Notation (JSON) format, wherein the mapping is provided as a service embodied as a layer in a network protocol stack; and
   assigning the role to the user.

2. The method according to claim 1, wherein the second service comprises a directory service.

3. The method according to claim 2, wherein the directory service manages user information and permissions for users.

4. The method according to claim 1, wherein the mapping of the role is defined by a domain-specific language having parameters that match with one or more of the permissions granted to the user from the second service.

5. The method according to claim 4, further comprising creating a role-mapping expression for each of the plurality of roles, the role-mapping expression comprising:
   a field rule that defines one or more field and value pairs; and
   a user field that is indicative of a distinguished name of the user or any group to which the user belongs.

6. The method according to claim 1, further comprising receiving an access request for the first service from a computing device associated with the user, prior to the step of assigning.

7. The method according to claim 1, further comprising generating a mapping request comprising:
   a designation if a mapping is enabled or disabled;
   a list of the plurality of roles granted to users that match role-mapping rules; and
   rules that determine the users matched by the role-mapping rules.

8. The method according to claim 7, wherein the mapping request further comprises metadata that additionally defines roles assigned to the users.

9. The method according to claim 1, wherein the mapping is based on one or more mapping rules that allow for matching of one of the plurality of roles to the user based on the metadata received.

10. The method according to claim 1, wherein the assigning of the role to the user occurs when the user utilizes a search engine service.

11. A system, comprising:
    a role mapping service comprising a processor and a memory communicatively coupled to the processor, the memory storing instructions executable by the processor to perform a method to:
    establish roles for a first service, wherein the first service comprises a search engine service and the roles define permissions granted to a user for the first service;
    map one or more roles to the user based on metadata of the user received from a second service, the metadata being indicative of permissions granted to the user by the second service, the roles and the permissions that are mapped to the user corresponding to user permissions in the first service, resulting in the user permissions and authentication both being located at the second service, wherein the first service is further configured to utilize the user permissions and the authentication of the second service through role creation and mapping, wherein the roles comprise a combination of parameters specified in a JavaScript Object Notation (JSON) format, wherein the mapping is provided as a service embodied as a layer in a network protocol stack; and
    assign the one or more roles to the user.

12. The system according to claim 11, wherein the role mapping service is distinct from and communicatively coupled to the first service and the second service.

13. The system according to claim 11, wherein the role mapping service is configured to function as an application programming interface between the first service and the second service, the role mapping service providing role mapping and assignment of the one or more roles to users.

14. The system according to claim 11, wherein the metadata from the second service further comprises information that is indicative of the user within the second service.

15. The system according to claim 11, wherein the second service comprises a directory service of a network protocol layer.

16. The system according to claim 11, wherein the role mapping service employs a domain-specific language having parameters that match with one or more of the permissions granted to the user from the second service.

17. The system according to claim 16, wherein the role mapping service creates a role-mapping expression for each of the roles, the role-mapping expression comprising any one or more of the following:

a field rule that defines one or more field and value pairs; or a user field that is indicative of a distinguished name of the user or any group to which the user belongs, or other information that is indicative of an individual or user.

18. The system according to claim 11, wherein the role mapping service is further configured to receive an access request for the first service from a computing device associated with the user, prior to role assignment.

19. The system according to claim 11, wherein the role mapping service is further configured to receive a mapping request comprising:

a designation if a mapping is enabled or disabled;

a list of the roles granted to users that match role-mapping rules; and rules that determine the users matched by the role-mapping rules.

20. The system according to claim 19, wherein the mapping request further comprises metadata that additionally defines roles assigned to the users.

21. The system according to claim 11, wherein the role mapping service is performed by a server.

22. The system according to claim 11, wherein the role mapping service is performed by a cloud-based service.

* * * * *